United States Patent Office 3,060,155
Patented Oct. 23, 1962

3,060,155
TERPOLYMERS OF OLEFINS, MALEIC ANHYDRIDE AND HEXADIENE-1,5
Raymond H. Reinhard, Galveston, Tex., assignor to Monsanto Chemical Company, St. Louis, Mo., a corporation of Delaware
No Drawing. Filed Dec. 29, 1960, Ser. No. 79,150
6 Claims. (Cl. 260—78.5)

This invention relates to modified copolymers of lower olefins and 1,2-dicarboxylic acids or their anhydrides. More particularly, the invention relates to terpolymers of $C_2$ to $C_4$ olefins, maleic anhydride and hexadiene-1,5.

Copolymers of $C_2$ to $C_4$ olefins with 1,2-dicarboxylic acids or their anhydrides such as maleic anhydride, for example, are well known and widely used in various applications. Their utility is limited somewhat, however, by the fact that the known polymers are relatively low-molecular-weight materials. The desirable higher-molecular-weight copolymers can be made only with difficulty because of the long reaction times required at high pressures for producing them. Consequently, attempts have been made to increase the molecular weight of the copolymers by introducing small amounts of a third component into the polymerization system. While this has been successful to a degree, most of such added components taught in the art effect cross-linking and result in interpolymers which are gelled compositions not soluble in water but only water-swellable. These materials are useful in applications where thickening is required but they are not adaptable for use in areas where both relatively high molecular weight and water solubility are required such as in clay beneficiation, for example.

The need for water-soluble interpolymers of olefins and 1,2-dicarboxylic acid or their anhydrides in a broader molecular weight range has now been met by the discovery that suitable modification of the basic olefin-acid or olefin-anhydride resin with respect to molecular weight can be simply and readily effected by interpolymerizing hexadiene-1,5 with the olefin and acid or anhydride. The resulting terpolymers, which are novel compositions, exhibit no gel formation but are water-soluble and yet possess molecular weights substantially in excess of those of the unmodified copolymers. They, therefore, find broader applicability in the specific areas in which they are employed. The character of these terpolymers is indeed surprising in view of the fact that analogous $C_7$ and higher dienes when introduced into the olefin-acid or anhydride system yield gelled materials and that pentadiene and substituted pentadienes do not effect any molecular weight increase at all at comparable concentrations by weight when added to the reaction charge.

The novel terpolymers of the invention which are in fact modified copolymers of $C_2$–$C_4$ olefins and 1,2-dicarboxylic acids or their anhydrides are prepared by reacting $C_2$–$C_4$ olefins with 1,2-dicarboxylic acids or their anhydrides and hexadiene-1,5. The dicarboxylic acids can be maleic acid, fumaric acid, the mono or dichloro-substituted maleic and fumaric acids, alkylated maleic and fumaric acids, mono and diphenyl maleic acids, benzyl maleic acid, dibenzyl maleic acid, ethyl maleic acid or any similar acids containing a double bond in the chain between the carboxyl groups such as mesaconic and citraconic acids. Acids where the double bond has shifted from the 1,2-position such as itaconic and glutaconic acids can also be used. Preferably, however the anhydride of each of the above-mentioned acids capable of anhydride formation is employed rather than the acids.

More specifically, the novel polymers of the invention are terpolymers which are formed by polymerizing a monomeric mixture of a $C_2$–$C_4$ olefin, i.e., ethylene, propylene, n-butylene or isobutylene, or a mixture of such olefins, maleic anhydride and hexadiene-1,5. The amount of hexadiene-1,5 employed is critical and lies in the range from about 1% to about 6% by weight of the reacting monomers. Concentrations above 6% by weight have been found to yield gelled products which are outside the scope of this invention.

The polymerization is carried out in an inert organic solvent, preferably a non-polymerizing hydrocarbon solvent, having solvating action on both the monomers and the hexadiene but which has little appreciable solvent or swelling action on the terpolymer produced. In this way, the polymer is obtained in the form of a fine powder which only requires freeing from solvent before use. Suitable solvents include, for example, ethylene dichloride, ethyl acetate, dioxane and, particularly, aromatic hydrocarbons such as benzene, toluene and xylene.

The olefin and anhydride are ordinarily charged in the equimolar proportions in which they react although variations can be made in the actual proportions used. The monomers are preferably dissolved in an amount of solvent such that the solids content of the reaction slurry formed is about 10%–18% depending on the density of the solvent employed. This ordinarily represents an amount of solvent about six times the total weight of the compounds to be polymerized. The amount of solvent is not critical, however, and proportions of solvent as much as 10 to 20 times the weight of the reacting monomers may be used. Alternatively, the hexadiene-1,5 may be added to the mixture of anhydride and olefin during the course of the polymerization either over part or all of the polymerization period. The resulting solution is mixed thoroughly and heated sufficiently so that the polymerization reaction takes place.

An organic solvent-soluble catalyst is necessary. Any of the organic free-radical-generating catalysts is satisfactory. Among these are various organic solvent-soluble peroxygen compounds including benzoyl peroxide, capryl peroxide, acetyl peroxide, acetyl benzoyl peroxide, di-tert-butyl peroxide and others, azoisobutylronitrile, dimethyl azoisobutyrate and many others. Mixtures of such catalysts are also suitable in the process of making the terpolymers of the invention. Radiation polymerization can be used, too, e.g., such high energy radiation sources as X-rays, $\gamma$-rays, neutrons and the like can be used to initiate polymerization.

The polymerization can be carried out at a temperature within the range from 0° C. to 100° C. with optimum temperatures varying with the particular $C_2$–$C_4$ olefin employed. Preferred temperatures lie for the most part in the range from 40° C. to 80° C. Pressure may vary from atmospheric to about 600 p.s.i.g. or higher depending upon the particular olefin used.

At the completion of the polymerization reaction, the terpolymer is recovered from the organic solvent by any suitable means. While the terpolymers may be used in the anhydride form, they are more commonly employed in the form of their alkali metal or ammonium salts which are also soluble in aqueous medium. This conversion is generally effected by solution in the appropriate aqueous hydroxide. Alkali metal or ammonium salts of the terpolymers such as sodium, potassium, lithium, rubidium and caesium salts may be obtained by reacting the terpolymers with the stoichiometric amount of the corresponding hydroxide. Partial salts may, of course, be produced by using less than the quantity of alkali required to effect complete conversion of the carboxyl groups. When polymeric anhydrides are reacted with anhydrous ammonia, an appreciable amount of amide groups are formed resulting in mixed ammonium-amide polymeric salts.

The following specific examples, which are intended as illustrative only, will more clearly demonstrate the preparation of the novel terpolymers of maleic anhydride, $C_2$–$C_4$ olefins and hexadiene-1,5. All parts given are by weight.

*Example 1*

A series of polymerization runs were made in which ethylene, maleic anhydride and hexadiene-1,5 were polymerized. A one-gallon autoclave fitted with a paddle stirrer and pressure control means was employed as the polymerization reactor. After it had been completely dried and freed of air, a mixture of 181.5 parts of maleic anhydride dissolved in 2100 parts of benzene was charged to the reactor and heated to a temperature of about 70° C. To this solution was added 7.2 parts of benzoyl peroxide and varying proportions by weight of hexadiene-1,5. The reactor was then charged with sufficient ethylene to give a pressure at reaction temperature (70° C.) of approximately 600 p.s.i.g. The contents of the reactor were continuously agitated during the addition of the ethylene and throughout the entire reaction period. Additional ethylene was charged periodically to maintain the pressure at 600 p.s.i.g. The reaction was continued until the samples withdrawn at intervals and titrated with sodium hydroxide indicated that 98+% of the anhydride had been reacted (6 hr.). At that point, unreacted ethylene was vented from the reactor, the reaction mixture was cooled and filtered, and the separated terpolymer was washed with benzene and dried.

Since the molecular weight of terpolymers of this type is directly related to their specific viscosity with an increase in molecular weight being reflected by an increased specific viscosity, the specific viscosity of each terpolymer was determined at 25° C on a 1% by weight solution of the polymer in dimethylformamide.

Results of these determinations tabulated below demonstrate clearly that hexadiene-1,5 in the polymerization charge effects a significant increase in molecular weight in the basic ethylene-maleic anhydride copolymer, the effect being proportionate to the amount of the diene employed. A copolymer made under the same conditions except that ethylene dichloride was used as the solvent medium but containing no hexadiene-1,5 together with polymers containing 7% and 10% hexadiene-1,5, respectively, are included for comparative purposes. They provide confirmation that the unique character of the terpolymers is achieved only with a specific range of concentration of the hexadiene-1,5, i.e., an amount from about 1% to about 6% by weight of the reacting monomers.

| Polymer No. | Hexadiene-1,5, percent by wt. | $\eta$ sp |
| --- | --- | --- |
| 185 | 0 | 0.43 |
| 170 | 1 | 0.73 |
| 171 | 4 | 1.9 |
| 177 | 5 | 3.2 |
| 178 | 6 | 3.6 |
| 176 | 7 | (¹) |
| 175 | 10 | Gel |

¹ Partial Gel.

*Example 2*

Following the procedure of Example 1 except using a temperature of about 80° C. and a pressure of 60 p.s.i.g., equimolar proportions of propylene and maleic anhydride and amounts of hexadiene-1,5 varying from about 1% to about 6% by weight of the polymerizable mixture are interpolymerized. The terpolymers produced are characterized like those in Example 2 by increasing molecular weights as the amount of hexadiene-1,5 in the polymers is increased with all the terpolymers having a molecular weight higher than that of the copolymer of propylene and maleic anhydride made under the same conditions. Similar results are obtained when isobutylene is substituted for propylene and the polymerization is carried out at a temperature of about 55° C. and a pressure of 10 p.s.i.g.

What is claimed is:

1. A terpolymer of substantially equimolar proportions of maleic anhydride and an olefin having from 2–4 carbon atoms and from about 1% to about 6% by weight based on the reacting monomers of hexadiene-1,5.

2. A terpolymer of substantially equimolar proportions of maleic anhydride and ethylene and from about 1% to about 6% by weight based on the reacting monomers of hexadiene-1,5.

3. A terpolymer of substantially equimolar proportions of maleic anhydride and propylene and from about 1% to about 6% by weight based on the reacting monomers of hexadiene-1,5.

4. A terpolymer of substantialy equimolar proportions of maleic anhydride and isobutylene and from about 1% to about 6% by weight based on the reacting monomers of hexadiene-1,5.

5. The process for producing terpolymers of maleic anhydride, an olefin containing from 2 to 4 carbon atoms and hexadiene-1,5 which comprises polymerizing substantially equimolar proportions of an olefin containing from 2–4 carbon atoms and maleic anhydride with hexadiene-1,5 in an amount in the range from about 1% to about 6% by weight of the reacting monomers in an inert organic solvent in the presence of a free-radical-generating catalyst at a temperature in the range from about 0° C. to about 100° C.

6. The process for producing terpolymers of ethylene, maleic anhydride and hexadiene-1,5 which comprises polymerizing a mixture of maleic anhydride and ethylene in substantially equimolar proportions with an amount of hexadiene-1,5 in the range from about 1% to about 6% by weight of the reacting monomers in benzene in the presence of benzoyl peroxide at a temperature in the range from about 40° C. to about 80° C.

References Cited in the file of this patent

UNITED STATES PATENTS

| | | |
| --- | --- | --- |
| 2,894,917 | Tsunoda | July 14, 1959 |
| 2,923,692 | Ackerman et al. | Feb. 2, 1960 |